C. W. ANDERSON.
CONTROL MEANS FOR DRIVE MECHANISM.
APPLICATION FILED MAY 28, 1919.
1,387,445.
Patented Aug. 16, 1921.
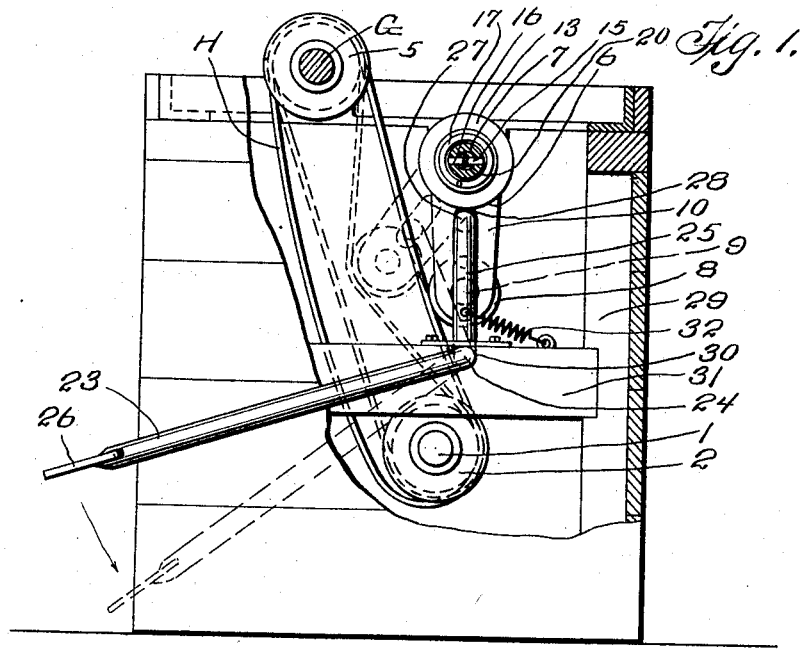
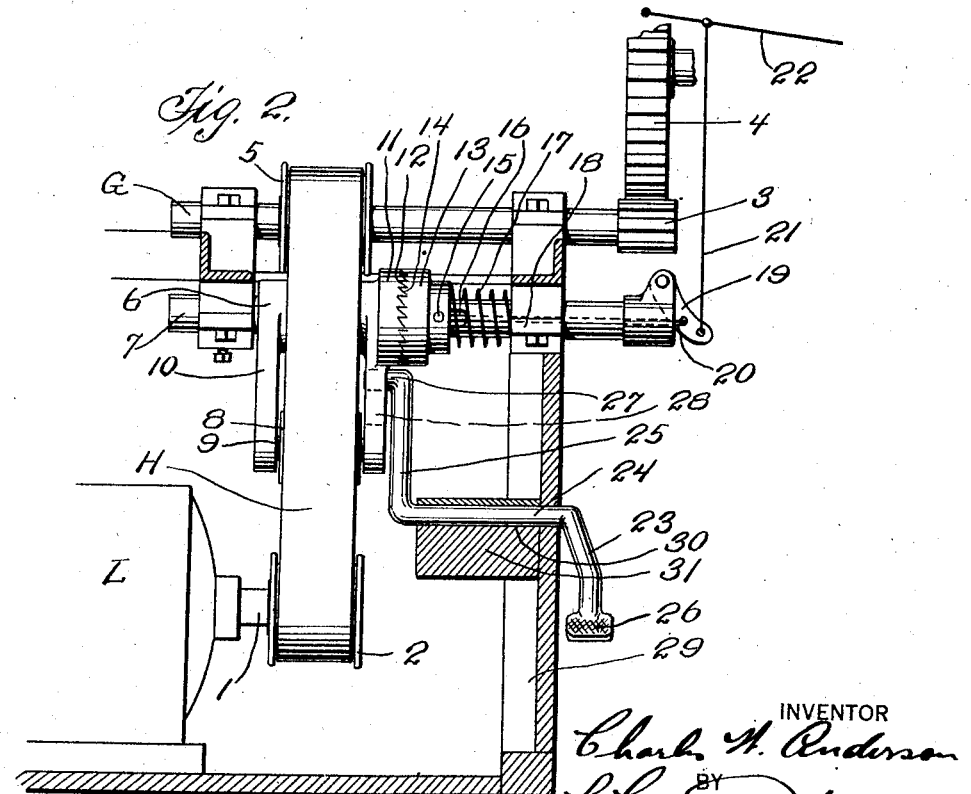
INVENTOR
Charles W. Anderson
BY
ATTORNEY

UNITED STATES PATENT OFFICE.

CHARLES W. ANDERSON, OF BROOKLYN, NEW YORK.

CONTROL MEANS FOR DRIVE MECHANISM.

1,387,445.  Specification of Letters Patent. Patented Aug. 16, 1921.

Application filed May 28, 1919. Serial No. 300,304.

*To all whom it may concern:*

Be it known that I, CHARLES W. ANDERSON, residing at Brooklyn, in the county of Kings and State of New York, have invented certain new and useful Improvements in Control Means for Drive Mechanism, of which the following is a specification.

This invention relates to a foot power control means for drive mechanism, and is particularly adapted for use in connection with drive mechanism for hod-elevators and the like, such as is illustrated and described in my pending application Serial No. 161,344, filed April 11, 1917.

A particular object of the present invention is to provide a power control means employing a slack belt with a tightener therefor, and with a foot lever so disposed as to conveniently operate the belt-tightener at will.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings which are to be taken as a part of this specification, and in which I have shown merely a preferred form of embodiment of the invention:

Figure 1 is a side elevational view, partly in section, of a power control means constructed in accordance with this invention, and Fig. 2 is a front elevational view, partly in section, of the structure shown in Fig. 1.

Referring to the drawings for describing in detail the structure which is illustrated therein, the reference character L indicates a motor having a shaft 1 and a drive pulley 2.

The reference character G indicates a shaft carrying a pinion 3, for engaging the drive gear 4 of a hod elevator or the like, said shaft G also carrying a pulley 5 to be driven from the pulley 2.

A slack belt H extends between the pulleys 2 and 5.

The belt-tightener includes a body member 6 which is mounted to oscillate upon a fixed shaft 7 arranged substantially parallel to the shafts 1 and G and adapted to hang below said shaft 7. At its lower end the body member 6 is provided with a belt-tightening roller 8 which is mounted upon a pin 9 extending between spaced arms 10 of said member 6.

Normally the roller 8 hangs free of the belt H.

Due to the slackness of the belt no motion is transmitted from the pulley 2 to the pulley 5 except when the roller 8 is pressing against the belt.

Any suitable means may be employed for retaining the belt-tightener in tightening position when desired. Examples of such means are illustrated in my copending applications Serial No. 161,343, Serial No. 161,-344, and Serial No. A-105, the latter illustrating a clutch mechanism similar to that shown in Fig. 2 herein. In said Fig. 2 the body member 6 is provided with a clutch member 11 at one side thereof, concentric with the shaft, the outer face of the clutch member being formed with suitable ratchet teeth 12 thereon. A coöperating clutch member 13 is mounted upon the shaft 7 to slide longitudinally thereon toward and away from the clutch member 11, the opposing face of the clutch member 13 being provided with teeth 14 for engaging the teeth 12. A pin 15 carried by the clutch member 13 extends transversely through a slot 16 formed in the shaft 7 adapted to prevent unlimited rotation of the clutch member 13 about said shaft. A spring 17 is interposed between the clutch member 13 and the opposing face of the adjacent support 18 of the shaft 7 adapted to urge the clutch member 13 at all times toward and into engagement with the clutch member 11.

Any desired means may be employed for moving the clutch member 13 against the pressure of the spring 17, as occasion may require, an example of such means being illustrated herein, and conforming in principle to the structure disclosed in the copending application Serial No. 161,344. It includes a small arm 19 pivotally mounted at one end of the shaft 7, and being connected by a link 20 with the pin 15, said link 20 being extended longitudinally of the shaft 7 through a central bore formed in said shaft to receive it. The arm 19 carries a chain, or link, 21 which extends into connection with an automatic control lever 22 by which the arm may be automatically swung to pull back the clutch member 13 whenever the control lever 22 is lifted.

When the roller 8 is in belt-tightening position, and the clutch members 11 and 13 are in engagement with each other, said clutch members positively retain the roller 8 in engagement with the belt until the clutch member 13 is drawn backwardly. As soon as the clutch member is drawn backwardly, however, the roller will immediately fall away from the belt and the driving connection between the pulleys 2 and 5 will be broken. The driving connection will remain broken until the roller is again swung into tightening position.

The foot lever 23 is mounted and connected with the belt-tightener so as to swing the belt-tightener manually into tightening position at will. It may be made up in any suitable form, but is preferably shaped from a single rod bent to provide a pivot portion 24, an operating end portion 25 at one side of the pivot, and a foot treadle portion 26 at the other side of the pivot. The end of the portion 25 is bent to form an engaging lug 27 projecting into a slot 28 which is formed through one of the arms 10 of the body member 6. All of the parts are carried by or within a suitable frame, or casing, 29 and the pivot portion 24 is mounted within a bearing 30 formed within a cross member 31 of said frame, the foot treadle portion 26 extending exteriorly of the frame into a position of ready accessibility.

A tension spring 32 engages between the portion 25 of the foot lever and a portion of the frame for normally urging the belt-tightener into non-tightening position.

It will be particularly noted that the relative position of the axes of rotation of the belt-tightener and the foot lever is such that as the roller 8 nears its tightening position, a desirable degree of cam, or wedge action, of gradually increasing force, takes place between the lug 27 and the opposing wall of the slot 28, thus enabling a desired amount of pressure to be applied against the roller without undue exertion on the part of the operator. This wedge, or cam, action is clearly indicated by the dotted lines in Fig. 1 from which it will be seen that the farther the lug 27 swings to the left, the more nearly its path of travel approaches a straight line indicating the longitudinal axis of the slot.

It will be noted, further, that the portion 25 of the lever stands at all times to oppose movement in one direction of the body member 6 longitudinally along the shaft 7. The body member 6 being otherwise free to move along the length of the shaft 7, the portion 25 of the lever serves to retain the roller 8 in proper coöperative alinement with the belt. At the same time, it serves to retain the clutch member 11 against movement with the clutch member 13 when attempt is made to draw the clutch member 13 away from the clutch member 11.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. The combination with a drive pulley, a driven pulley, a slack belt extending between said pulleys, a belt-tightener movable into and out of belt-tightening position, and a frame for supporting all of said parts, of a foot lever pivotally supported by said frame, being connected to swing said belt-tightener into tightening position at will, and having a foot treadle portion extending to a position of accessibility beyond said frame.

2. The combination with a drive pulley, a driven pulley, a slack belt extending between said pulleys, and a belt-tightener movable into and out of belt-tightening position, of manual control means for said belt-tightener, said control means and said belt-tightener having parts movable along different paths and engaging together to afford a wedge action of the control means against the belt-tightener.

3. The combination with a drive pulley, a driven pulley, a slack belt extending between said pulleys, and a belt-tightener for said belt, said belt-tightener comprising a pivotally mounted body member having an extending portion arranged to swing into and out of tightening position against the belt, of an operating member for the belt-tightener, said operating member being pivotally mounted eccentrically of the belt-tightener and having a portion removed laterally from its pivot and engaging the extending portion of the body member whereby to swing the body member about its pivot.

4. The combination with a drive pulley, a driven pulley, a slack belt extending between said pulleys, a belt-tightener movable into and out of belt-tightening position, and a pivotal support for the belt-tightener upon which the belt tightener is loosely mounted, of an operating element for swinging the belt-tightener about its pivot, said operating element comprising a part standing to obstruct movement of the belt-tightener along its pivotal support.

5. The combination with a drive pulley, a driven pulley, a slack belt extending between said pulleys, a belt-tightener movable into and out of belt-tightening position, a pivotal support for the belt-tightener upon which the belt-tightener is loosely mounted, and a clutch for retaining the belt-tightener in tightening position, said clutch being of a character such that the operation thereof requires that the belt-tightener be restrained against movement longitudinally of its support, of an operating element for swinging the belt-tightener about its pivot, said operating element comprising a part standing to obstruct movement of the belt-tightener along its pivotal support.

6. The combination with a drive pulley, a driven pulley, a slack belt extending between said pulleys, a belt tightener for said belt, and a pivotal support for said belt tightener, said belt tightener comprising a body member pivotally mounted upon said support and having an extending portion arranged to swing into and out of tightening position against the belt, said extending portion having a slot therein extending longitudinally thereof, of an operating member by which manually to swing the belt tightener, said operating member comprising a pivot part by which it is pivotally supported and comprising another part extending radially from the pivot part and engaging within said slot, and a bearing for the pivot part of said operating member at one side of the pivot of the belt tightener.

In testimony whereof I affix my signature in the presence of two witnesses.

CHAS. W. ANDERSON.

Witnesses:
L. GESSFORD HANDY,
E. W. HAVILAND.